May 12, 1959     J. G. MACORMACK     2,885,743
INSULATING STRUCTURES FOR REFRIGERATED SPACES

Filed June 2, 1953     2 Sheets-Sheet 1

James G. Macormack    Inventor

By    Attorney

May 12, 1959 J. G. MACORMACK 2,885,743
INSULATING STRUCTURES FOR REFRIGERATED SPACES
Filed June 2, 1953 2 Sheets-Sheet 2

James G. Macormack, Inventor
By *[signature]* Attorney

United States Patent Office 2,885,743
Patented May 12, 1959

2,885,743

INSULATING STRUCTURES FOR REFRIGERATED SPACES

James G. Macormack, Mount Kisco, N.Y., assignor to Alumiseal Corporation, New York, N.Y., a corporation of New York Application June 2, 1953, Serial No. 359,142

4 Claims. (Cl. 20—4)

The present invention relates in general to insulating structures and more particularly to insulating structures such as are used for low-temperature refrigerators for cold storage and the like.

Heretofore, many proposals have been made for such structures, including the use of reflective sheet aluminum or steel insulation and metal foil insulation and the present invention is particularly concerned with the use of sheet aluminum structures.

It is well known that free water will be present as a condensation of atmospheric moisture whenever there is a large temperature differential between the outside and the inside. Thus, whether the insulating structure is for keeping heat out or keeping heat in, or merely for humidity control, water vapor will pass from the zone of higher temperature and pressure to the zone of lower temperature and pressure and will condense as free water, unless such passage is prevented.

In some prior structures, prevention of the passage of water vapor has been achieved, to some extent at least, by welding the edges of the metal plates forming the structure or by caulking the abutting edges thereof, but should any spots be skipped during the caulking or welding, free water can collect, and, as previously stated, can cause deterioration of the metal with consequential loss of insulating efficiency.

In the field of reflective insulation, with which this invention is generally concerned, it has been discovered that four factors must be present for utmost efficiency. These are: high reflectivity of radiant heat; ample rigidity in order that the structure shall be self-supporting and shall maintain definitely dimensioned airspaces between sheets forming the structure; proof against rust, deterioration and disintegration caused by contact with free water; and a definite vapor barrier to seal the component parts of the structure from the passage therethrough of moisture vapor whereby to limit the free water to an utmost minimum.

It is, however, well known that no vapor seal is perfect and some leakage through the seal will be experienced, particularly under high temperature differentials on each side of the seal.

Particularly with respect to refrigeration rooms of various kinds, as used, for example, in storage of foodstuffs, there exists a problem which is the direct result of the partial permeability of the seal joints of the refrigerated space. In such structures the exterior or warm side is sealed as effectively as possible by various methods, but the normal practice is to seal the joints of the inner liners or walls of the refrigeration space, which are, of course, on the colder side, by overlapping joints or by covering the joints with strips of various kinds which do not form an air-tight or vapor seal.

It has been found that in such locations where joints of such liners are sealed in accordance with these normal practices of overlapping butt joints or simple coverings with cover or mold strips, substantial condensation occurs within the insulation construction, even though that construction is most effectively vapor-sealed on the exterior or warm side. It is believed that the cause of this condition of condensation is that in such rooms with joints of the exposed liner normally and inadequately constructed, action of blower fans of the refrigeration units or the bellows action of opening and closing of entrance doors can force movement of air from the refrigerated room into the space above or behind the liner of the reflective insulation construction. Conventionally, this space usually is substantial, being in walls ¾" dimension and in ceilings 1⅝" dimension in a typical construction.

The air forced into this space will carry with it moisture vapor. The air, with its moisture vapor, on entering this first reflective air space will be raised in temperature, inasmuch as this air space is warmer than the temperature of the refrigerated room. The air in the space, however, is in direct contact with the back of the metal liner which faces directly into the lower temperature of the refrigerated room and, being comparatively thin metal, will have at its back surface approximately the same temperature as the front surface contacting the refrigerated air. As the temperature of the air which has been forced into the first air space raises, dewpoint differential will be reached between this air and this cold metal surface of the liner, and the air will condense its moisture on the cold liner.

This collection of condensate will accumulate to the point of leaking from the joints of the liner into the refrigerated room, causing undesirable and damaging dripping from ceilings or walls and presenting a problem in the specific art.

It is an object of the present invention to provide a method and an insulating structure using reflective insulation which will solve this specific problem of condensation and dripping in the interior refrigerated space to the highest degree.

It is a further object of the invention to provide a new and useful reflective insulating construction for a refrigerated space which is vapor sealed, self-supporting, highly resistant to deterioration, highly reflective to infrared radiation with consequent low emissivity, easy and quick to assemble and produce and of relatively low cost construction and yet will be so sealed on both the warm side and the cold side as to minimize and remove deleterious leaking and dripping of moisture due to condensation of water vapor in between the inner and outer walls forming the refrigeration enclosure, even when high humidity conditions are encountered.

In accordance with the present invention, provision is made to so seal the inner liners of the refrigerated space and the outer walls thereof that a balance of leakage through the liners and through the walls is obtained which prevents excess of condensation of water vapor in the spaces between the liners and the walls and the subsequent leakage and dripping of moisture in liquid phase into the interior of the refrigerated space.

To obtain this result, all joints of the exposed or inner liners facing refrigerated spaces are adequately sealed to prevent air passage through the joints thereof, but this sealing construction is so balanced that it is no more impervious to moisture vapor, namely water in vapor phase, than is the joint sealing construction of the external vapor barrier on the warm side of the structure.

In reflective insulation construction, this small amount of moisture vapor which permeates an efficient external vapor seal will condense on cold surfaces of sheets through the construction, which are below dewpoint of the moisture vapor. This condensate facing on comparatively large air spaces will continually re-evaporate and breathe to the lower temperature, lower pressure zone, eventually breathing through the joints of the interior liner and traveling to the lowest temperature, lowest pressure zone, which is at the refrigeration coils where it will form as frost or condensate. Accordingly, the sealing of the joints of the interior liner, although required to be air-tight, must not be less permeable to passage of moisture vapor than is the external vapor-barrier construction. Otherwise, re-evaporation and breathing of condensate from external moisture vapor permeation cannot proceed at a balancing rate with the external permeation.

Specifically, in practicing the present invention an outer wall or walls are formed using a plurality of aluminum sheets, for example sheets .006" thickness, which are abutted together and are thereafter sealed at their abutment on all sides with a metallic tape of flexible and/or ductile condition which carries an adhesive backing suitable to permit sealing of the tape over the abutting edges in a permanent manner to form a complete vapor barrier.

Aluminum sheets of this thickness are self-supporting and have a high reflectivity of about 95% and a corresponding low emissivity for infrared radiations or radiant heat, as well as the property of withstanding water of condensation, or free water, in contact therewith for infinitely long periods of time without any effect which temporarily or permanently impairs the reflective values thereof. By sealing the edges with an adhesively backed metal flexible and ductile tape, the leakage of moisture vapor through the structure is limited and reduced to a minimum. The sheets of aluminum used in carrying out the invention can be in long rolls of desired width which are attached by nails or like means to wooden studs fixed to align the sheets with abutting edges for application of the tape.

As is usual in refrigeration structures, there is provided a still air space adjacent the outer reflective sheet wall in order to obtain the highest efficiency. Several sheets of the aluminum may be employed with still air spaces on either side of the intermediate sheets, if desired, in order to increase the efficiency of the structure, and in such cases only one of the walls of the structure need be sealed by the vapor barrier tape, namely, the outer walls of the structure. In such case the sealing by the tape is on the reflective insulation sheet forming the high temperature side, since water vapor will tend to move from the warmer zone into the cooler zone.

According to the present invention, the inner or liner wall which faces on the refrigerated space is also composed of a plurality of sheets of aluminum of similar type as that used for the other wall or walls and the abutting edges of the sheets are vapor sealed by means of a tape of compressible material held in place and in sealing engagement with the lateral portions of the sheets by a molded channel strip, preferably formed of extruded aluminum.

This construction employing a composition tape, compressed and covered with a designed extruded mold strip, prevents air passage from the refrigerated room to the first reflective insulation space, but permits moisture vapor permeation from the first reflective space to the refrigerated room space at a rate equal to or greater than the rate of permeability of the external vapor barrier employed and prevents the excess accumulation of moisture condensation caused by air exteriug the insulation construction from the refrigerated room space.

Thus, in one embodiment of the invention a plurality of walls are formed of aluminum sheets mounted on a frame, each spaced apart an equal distance to provide a plurality of still air gaps, an outer and inner wall being provided, the outer one of which at the warm side is sealed at abutting edges by means of the vapor barrier tape, while the inner wall or liner is sealed at the cold side with a compressible composition tape compressed into sealing contact by a metal channel embracing same.

If desired the aluminum sheet may be surfaced or treated to add greater mechanical strength thereto, and particularly this is useful for the inside wall. To this end, the aluminum is treated as a final step in its fabrication to surfacing with a graining or pattern, such as a minutely formed waffle-weave or checkered pattern, whereby the metal sheets will be mechanically more rigid.

By using the aluminum sheets or rolls as set forth herein, corners can be formed by bending the sheet around same so that the difficulty of building up a vapor-proof corner is eliminated, this having been a problem heretofore.

When using a structure composed of a number of walls, each formed from the aluminum sheets or rolls, the number of walls and the size of the air spaces will be calculated to suit the temperature differential involved. In such cases, it is a further feature of the invention to stagger the wood or like separator strips forming the several frames upon which the aluminum is mounted to form the several walls, the staggering being such that direction of one or more courses of separator strips is reversed, whereby direct conduction of heat through the wooden members is avoided or minimized.

The invention will now be described with respect to the accompanying drawings which illustrate various embodiments of the invention, by way of example, and in which.

Referring now the drawings, in Figures 1, 2, 3 and 4 a portion of a complete refrigeration room is shown incorporating the present invention.

Figure 3:
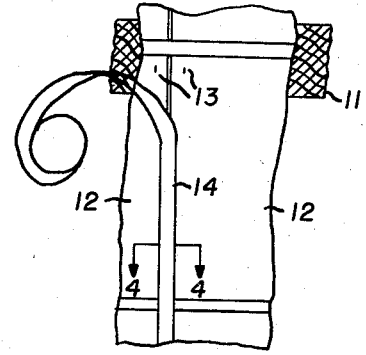
Figure 3 is an enlarged detail of the front view of a panel being sealed for the warm side of the structure of Figure 1.

An outer masonry wall 10 within which the refrigerating spaces are to be incorporated serves as a support for wooden battens 11. An outer wall of aluminum sheets, which may be of .006" thickness, if desired, is formed by mounting sheets 12 and battens 11 by tacking stapling or like conventional methods of attachment shown at 13 (Figure 3). The wall formed of panels 12 constitutes the first wall of the insulated refrigeration structure and is sealed on one side by a ductile metal tape 14 having an adhesive backing 15 (Figure 4), said tape being applied to the abutting edges of panels 12 to seal these, as shown in Figure 3. The sealing of the abutting edges of panels 12 forms the liner designated as A as a vapor sealed wall, tape 14 forming a vapor barrier on the warm side of the structure shown in Figures 1 and 2.

As is usual with insulating structures of the kind with which this invention is concerned, there are preferably provided several intermediate aluminum walls 16 and 17, which are formed of abutting aluminum sheets fastened in any conventional manner to spacer strips 18 and 19.

Figures 1, 2:
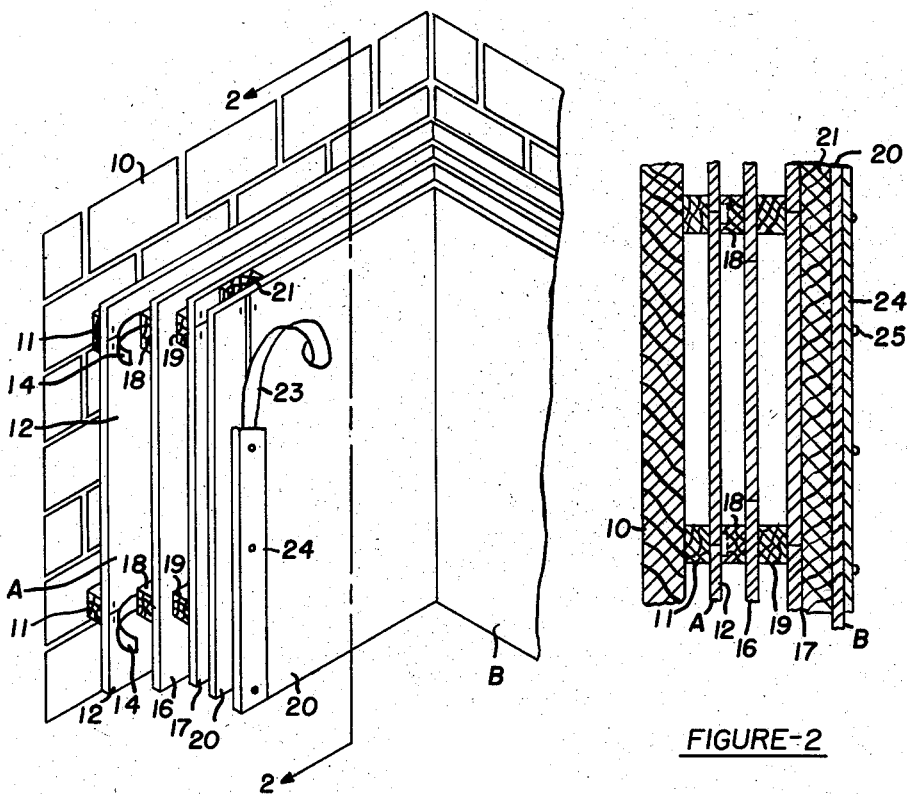
Figure 1 is an elevation in perspective of a typical installation for forming a refrigeration wall structure according to the present invention.
Figure 2 is a cross-section of the wall structure of Figure 1, taken on line 2—2 of Figure 1.
Figure 6:
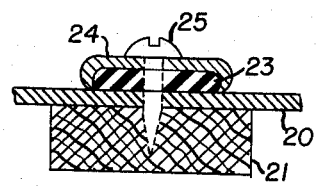
Figure 6 is a cross-section of the structure of Figure 5, taken on line 6—6 of Figure 5.
Figure 4:
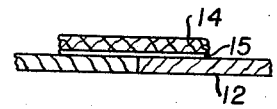
Figure 4 is a cross-section of the structure of Figure 3, taken on line 4—4 of Figure 3.
Figure 5:
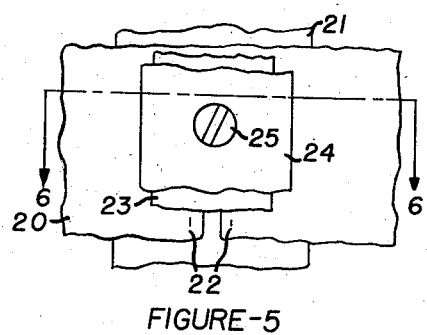
Figure 5 is a plan view on an enlarged scale of a liner or panel sealed for the cold side of the structure of Figure 1.

The inner wall or liner B which is to be in contact with the refrigerated spaces of the structure is also formed of a plurality of sheets of aluminum similar to the sheets forming the other walls or, if desired, of heavier gauge material to act as an inside wall for the refrigerated space or room. The sheets 20 are laid in non-abutting, but closely adjacent, arrangement of edges on a framework of wooden battens 21 and are suitably attached thereto, as before, by riveting, stapling, or the like, as shown at 22 (Figure 5).

In order to seal the joints of panels 20 to form a sealed inner wall or liner A, a plastic or composition strip 23 is applied over the adjacent edges of sheets 20 and is held in sealing contact with the peripheral edges of the sheets by a rigid channel 24 as extruded aluminum which is fastened to the battens by wood screws 25. Thus, liner B is formed as an air-tight wall in communication with the inner atmosphere of the refrigerated space, but due to the use of a compressible composition strip 23, the vapor barrier through liner B is not complete and is no better seal than is formed by tape 14 used for outer wall A. It will be realized that the seal of wall A is inherently a better sealing means than the seal of wall or liner B. This, in the present invention, is deliberately provided because the seal of wall A has to provide a vapor barrier between the warm or outside ambient temperature and the cool, inside refrigerated temperature. Since the tendency of direction of flow is from the warm side to the cold side, namely, from the warm exterior into the refrigerated space, as good a seal must be maintained at the warm side as possible. Because such a seal cannot, however, be perfect, the present invention provides an anner seal for the liner of the refrigerated space which is no more perfect than the outer vapor barrier.

Figure 7:
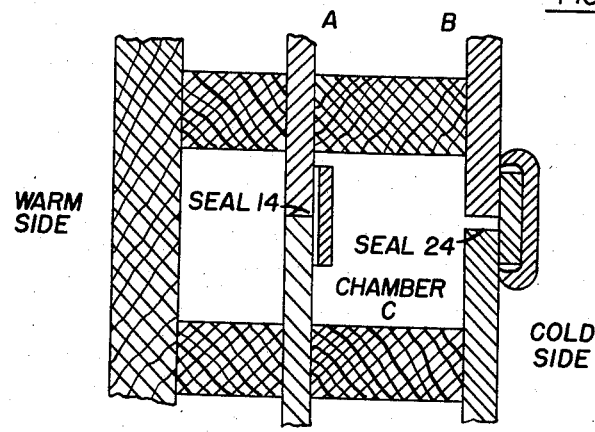
Figure 7 is a diagrammatic representation of the method of sealing the walls of a refrigerated structure according to the present invention.

This theory is illustrated in Figure 7, where the two walls A and B and seals 14 and 24 are shown as applied to a single chamber C therebetween. If the seal 24 of the present invention were not provided on the cold side, which is within the actual refrigerated space, action of the blower fans of the refrigeration unit or the bellows action of opening and closing doors such as entrance doors or inspection ports can force cold air into chamber C through the joints in liner B. The air so forced into chamber C will carry moisture vapor with it and since the air in chamber B will be at a higher temperature than that in the refrigerated space and, of course, a lower temperature than the ambient temperature on the warm side or outside the structure, the moisture would condense on the cool wall B and ooze through the joints between the panels thereof, whether the structure is the wall portion or a ceiling portion of the room, although obviously the ceiling portion is the worst problem because leakage from there can fall on goods stored in the refrigerated space.

By providing the seal 24 on liner B, this prevents ingress of the cold air into chamber C because such a design of seal is substantially air-tight, with respect to cold air ingress from the cold sides. However, the leakage of vapor through the vapor barrier 14 from the warm side into chamber C cannot completely be prevented and to avoid the effect of this vapor condensing and remaining as an increasing volume of water or frost on the cold wall or liner B and thus eventually leaking through as liquid condensate, the seal 24 is not impermeable to moisture vapor from egress from chamber C to the cold side, but allows this to pass from chamber C through the seal 24 into the cold refrigerated space where the condensate will be deposited in a satisfactory form, such as on the cooling coils of the refrigeration unit.

By virtue of the specific formation of seals 14 and 24, the balancing of vapor breathing between chamber C, the warm side and the cold side, is achieved. Seal 24 is so formed, therefore, as to be air-tight, but permits permeation of moisture vapor from chamber C into the refrigerated space at a rate equal to or greater than the rate of permeation through seal 14 to chamber C.

By utilizing a wall structure according to this invention with the seals 14 and 24 of different sealing characteristics, relative to each other, and with the seal of lesser moisture vapor permeability factor on the outside or warm side, there is provided an improved structure for refrigerated enclosures in which the problem of seepage of water condensate is minimized and substantially avoided.

The tape 14 comprising the one sealing means may be of ductile metal such as lead or a lead alloy having the adhesive bonding means 15 of any composition used for bonding metal to metal.

The composition seal strip 23 of seal 24 may be any plastic material of compressible characteristics, such as synthetic rubber or mixtures therewith.

I claim:

1. A refrigeration enclosure for use for extreme internal conditions of temperature and humidity relative to the outside, comprising an outer wall exposed to the warm side, an inner wall exposed to the cold side, said walls being spaced apart from each other a predetermined amount to establish an air space therebetween, a plurality of intermediate walls within said air space, all of said intermediate walls and said outer and inner walls being formed of metal sheets of self-supporting thickness laid edge to edge in the same plane to form a continuous wall in each instance and sealing means for the outer and inner walls comprising a ductile metal tape for the outer wall adhesively bonded to the adjacent edges of the outside warm face of the outer walls and sealing the outer walls airtight and moisture vapor sealing the joints to as great a degree as possible and a yieldable composition tape for the inner wall applied thereto and held in contact with the adjacent edges of the inner wall face of the inner wall sealing the inner walls airtight against passage of cold air therethrough from the cold side into said air space and moisture vapor sealing the inner wall to a degree slightly less than that of the outer wall to permit only limited breathing through the inner wall sealing means from the air space to the inner cold space embraced by the inner wall.

2. A refrigeration enclosure having two walls separated by a fixed air-space which is free of leakage of moisture into the interior caused by condensation within said air space comprising a framework of wooden battens to support an outside wall, a framework of wooden battens to support an inside wall, said frameworks being spaced apart a predetermined amount to establish an air space between walls carried thereby, a plurality of panels of self-supporting aluminum fastened to one framework with their edges in close proximity in one plane, a plurality of panels of self-supporting aluminum fastened to the other framework with their edges substantially abutting; a ductile tape in adhesive sealing contact over all abutting edges on one side of the panels of the framework for the outside wall forming an air-tight and substantially moisture vapor tight seal on the outer warm side of the enclosure; and a compression strip of yieldable composition in pressure sealing contact over all the adjacent edges on one side of the panels of the framework for the inside wall forming an airtight but only slightly moisture vapor permeable seal on the inside cold side of the enclosure, whereby moisture vapor accumulating within the air space formed between the walls carried by the framework can leak through to the cold space enclosed within the wall formed by the panels on the first framework.

3. A refrigeration structure according to claim 2 in which said compression strip is a rubber composition strip held in firm pressure contact with said panels by an embracing rigid channel which is fastened to the wooden battens of said framework for the inside wall, the pressure being of a predetermined amount.

4. A refrigeration enclosure comprising an inner refrigerated chamber confined by a substantially continuous wall of a metal liner and an outside chamber in contact with the warm side of the surrounded space formed of a substantially continuous wall of metal, said substantially continuous walls being spaced apart to provide a fixed airspace therebetween, means for permitting leakage from said airspace to said inner refrigerated chamber to prevent condensation of moisture within said airspace comprising an air-tight and substantially moisture vapor tight first seal for all the joints of the outer continuous wall said first seal being formed by ductile metal tape adhesively bonded to and over all metal joints of said outside wall on its outside face on the warm side and an airtight and only slightly moisture vapor permeable second seal for all the joints of the inner continuous liner on the cold side, said second seal being formed by a compressible composition tape compressed into a firm, fixed pressure sealing contact with all metal joints of the liner on its inside face on the cold side facing the refrigerated chamber.

References Cited in the file of this patent

UNITED STATES PATENTS

| | | |
|---|---|---|
| 134,702 | Piper | Jan. 7, 1873 |
| 275,000 | Waters | Apr. 3, 1883 |
| 1,964,795 | Frary | July 3, 1934 |
| 2,024,686 | Farmer | Dec. 17, 1935 |
| 2,036,429 | Moody | Apr. 7, 1936 |
| 2,044,600 | Williams | June 16, 1936 |
| 2,045,000 | Smith | June 23, 1936 |
| 2,098,554 | Reinke | Nov. 9, 1937 |
| 2,295,248 | Wittner | Sept. 8, 1942 |
| 2,613,166 | Gronemeyer | Oct. 7, 1952 |
| 2,663,448 | Spiegelhalter | Dec. 22, 1953 |

FOREIGN PATENTS

| | | |
|---|---|---|
| 24,195 | Great Britain | Dec. 8, 1904 |

OTHER REFERENCES

American Roofer, July 1942, page 21.

Condensation in Walls and Attics by L. V. Teesdale-Forrest.

Products Laboratory, U.S. Dept. of Agriculture, December 1937, page 7. (Copy in Div. 33.)